Oct. 28, 1924.
H. A. GERKEN
ILLUMINATION INDICATOR FOR LAMPS
Filed Nov. 21, 1922   3 Sheets-Sheet 1
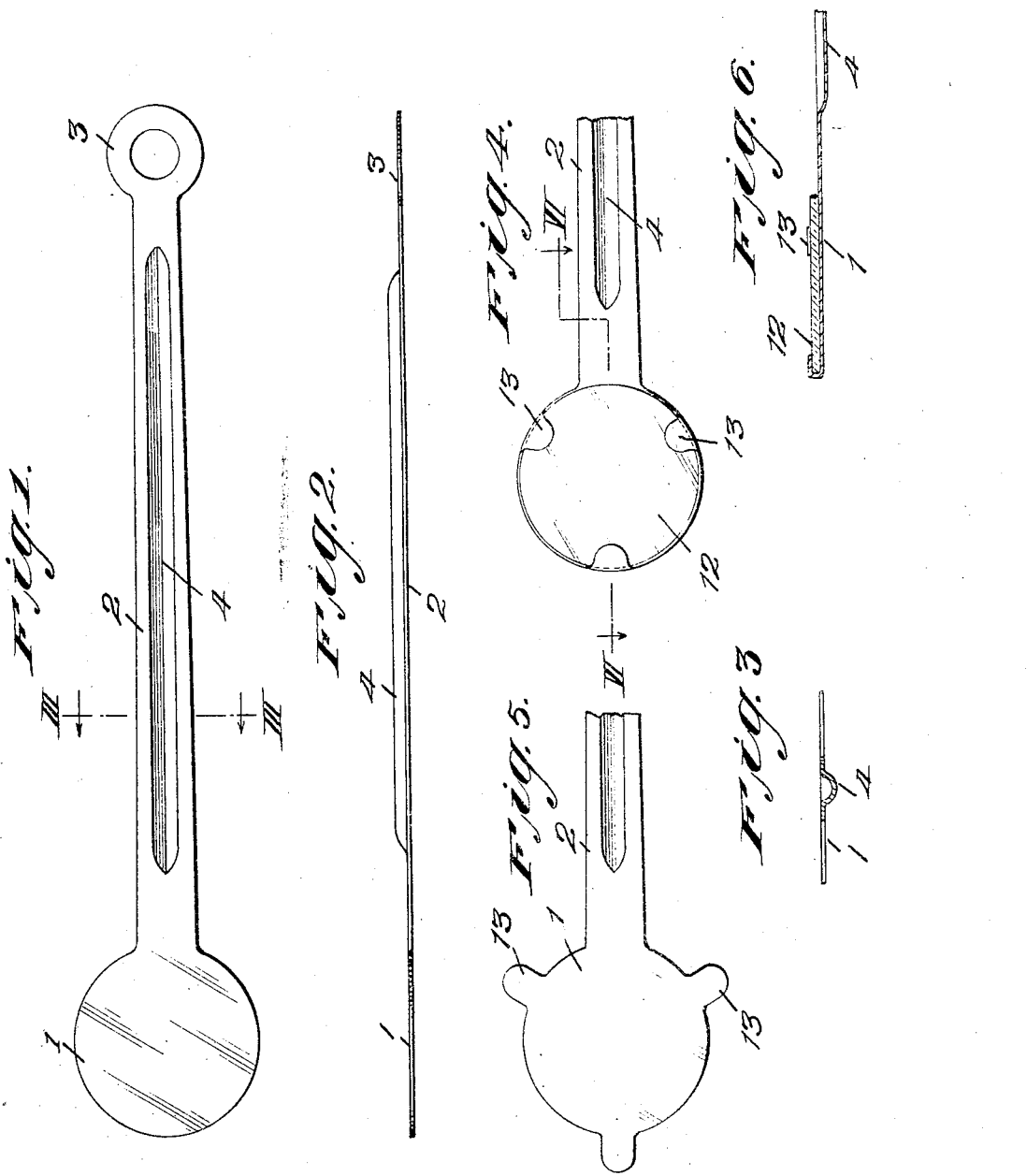
INVENTOR
Henry A. Gerken
BY
ATTORNEYS Oct. 28, 1924.

H. A. GERKEN

ILLUMINATION INDICATOR FOR LAMPS

Filed Nov. 21, 1922

INVENTOR
Henry A. Gerken
BY
ATTORNEYS

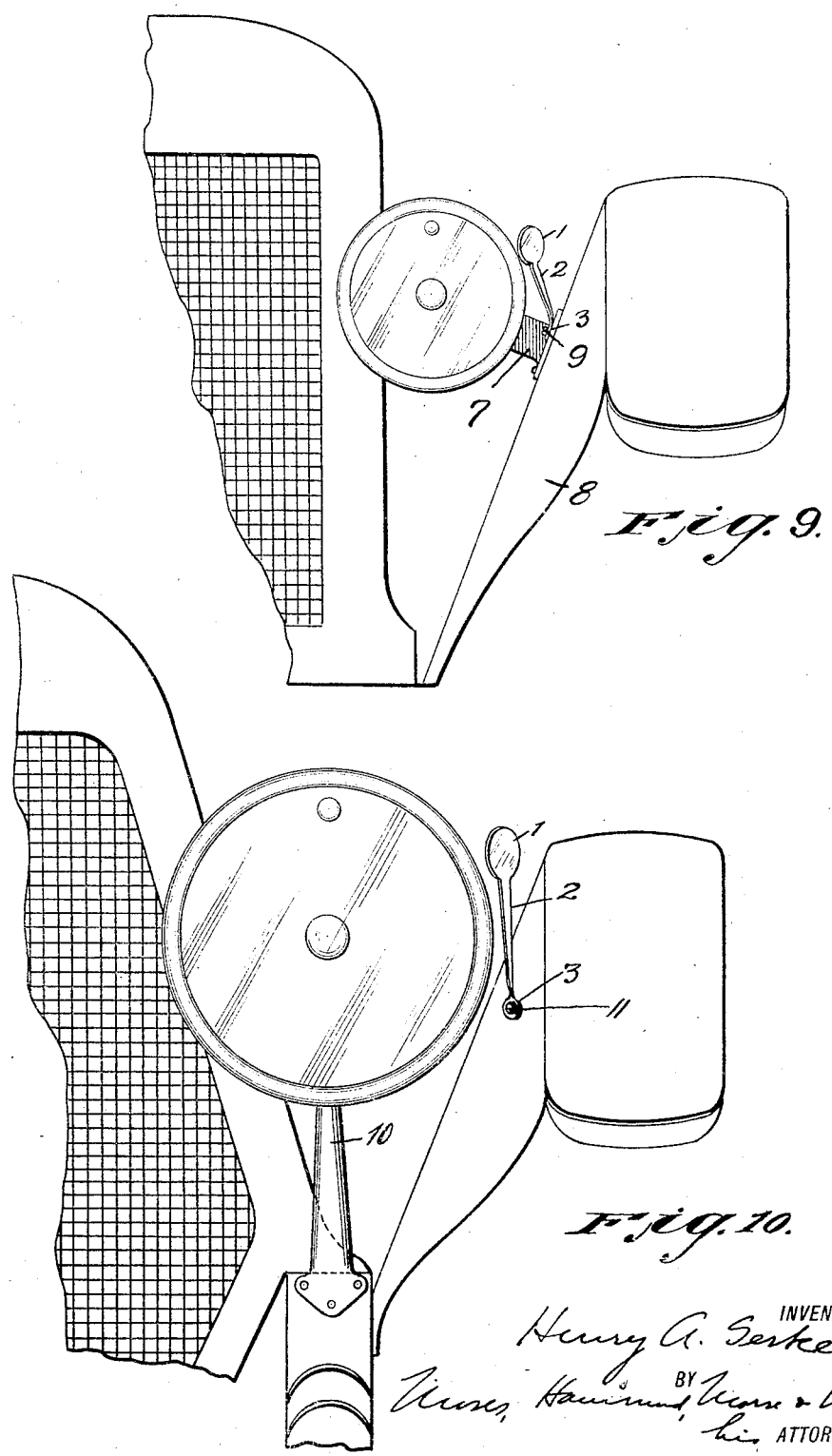

Patented Oct. 28, 1924.

1,513,545

UNITED STATES PATENT OFFICE.

HENRY A. GERKEN, OF NEW YORK, N. Y.

ILLUMINATION INDICATOR FOR LAMPS.

Application filed November 21, 1922. Serial No. 602,411.

*To all whom it may concern:*

Be it known that I, HENRY A. GERKEN, a citizen of the United States, residing in the city, county, and State of New York, have invented certain new and useful Improvements in Illumination Indicators for Lamps, of which the following is a specification.

This invention relates to illumination indicators for lamps, particularly the lamps of automotive vehicles, for indicating to the driver or other occupant of the vehicle that the same are properly lighted.

A good understanding of the invention may be had from the following description having reference to the accompanying drawing, in which—

Figure 1 is a plan view of one form of embodiment of the invention;

Figure 2 is a side elevation of Figure 1;

Figure 3 is a section of Figure 1 on line III—III, looking in the direction of the arrows;

Figure 4 is a view showing a modification of Figure 1;

Figure 5 is a view showing the metal blank employed for manufacture of the device shown in Figure 4;

Figure 6 is a view showing a section of Figure 4 on line VI—VI, looking in the direction of the arrows;

Figures 9 and 10 are views similar to Figure 8, showing the indicator of the present invention applied to other types of automobile headlights.

Similar characters of reference designate similar parts in each of the several views.

The indicator illustrated in Figure 1 is composed of a single piece of non-rusting sheet metal such, for example, as aluminum or suitable alloy, and consists of three main portions, namely a head 1, a stem 2 and a base 3. The head is circular in shape and is provided with a polished surface for reflecting light from the automobile lamp toward the driver, as hereinafter set forth. The base 3 may be of any suitable form but is preferably in the shape of an eye for receiving a bolt or other fastening member for securing the device to the body of the automobile, as hereinafter set forth. The stem 2 extends from the base to the head and is tapered slightly toward the base, as indicated in Figure 1. A rib 4 is formed in the stem, by stamping or in any other suitable manner, to provide re-enforcement therefor.

Figure 7:
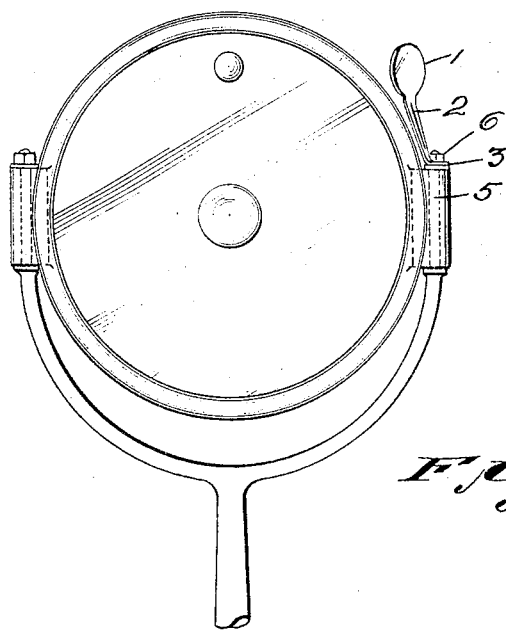
Figure 7 is a front elevation illustrating the manner of applying the indicator to one well-known type of automobile headlight.
Figure 8:
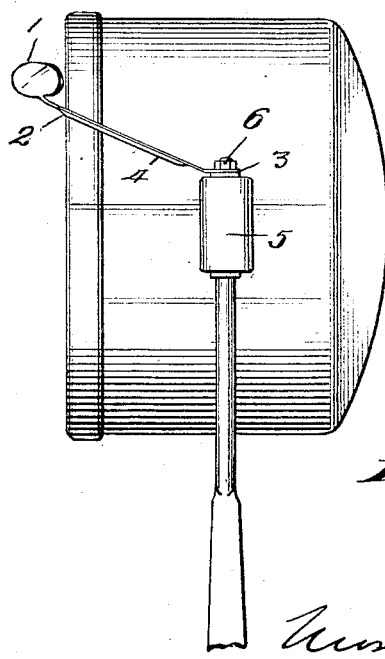
Figure 8 is a side view of Figure 7.

For practical use, the indicating device is mounted adjacent to the lamp for which it is to serve as an indicator, the particular form and manner of mounting being dependent upon the type of lamp support. In the type of construction shown in Figures 7 and 8, the reflecting device is mounted on one of the bolts 5 of the lamp bracket, the nut 6 thereof being first removed to permit the eye 3 of the device to be placed over the shank of bolt 5, and the nut thereupon being replaced. The stem 2 of the device is then twisted and bent adjacent the base and adjacent the head in such manner that light from the lamp is reflected toward the operator of the vehicle. The reflector thus serves as an absolute indicator of the illumination of the lamp. In the preferred embodiment of the invention the reflecting surface is given a somewhat dulled finish so that the intensity of the light reflected toward the driver is not such as to produce a glare or interfere with the operator's clear vision of the road. The particular adjustment of the reflector depends in each case upon the geometrical relation existing between the various parts, as will be readily understood.

In Figure 9 the device is shown in operative relation to a lamp which is provided with a supporting bracket of a type bolted to the fender 8 of the vehicle. In this case, the eye of the bracket is placed over one of the bolts 9 of the bracket, and the device is thereupon bent adjacent its base and adjacent its head into the proper shape for reflecting the light of the lamp toward the driver of the vehicle.

It will be noted that in both of the above cases the indicating device of the present invention may be affixed to the lamps without the use of any separate attaching members, and without mutilating any parts of the automobile body. The manner of attachment is so simple that it can be performed by any one and with simple tools, little, if any, mechanical skill being required.

But even if, as in certain instances, the lamp support is of such construction that the previously described manner of attachment is not feasible, the device may be attached readily by affixing it to some convenient part of the body, as for example, by bolting the eye 3 to the adjacent fender of the vehicle, a bolt 11 being passed through an opening, made for this purpose, in a convenient place on the fender.

It will be observed that in each case the flexibility of the stem 2 permits of a ready and convenient adjustment of the reflecting device into the proper position. This feature is of importance owing to the large amount of variations of the geometrical relation of the parts, which relations differ, of course, with the various makes of cars.

It will be observed, moreover, that by virtue of the stiffening rib 4 the twisting and bending of the stem is substantially limited to the parts adjacent the head and base, respectively, the intermediate parts of the stem, by virtue of the stiffening rib, serving to keep the device in adjusted position.

In the modified form of construction of the indicating device, as illustrated in Figure 4, the head 1, instead of having an integral reflecting surface, is provided with a glass mirror 12 which mirror is secured to the head by means of tongues 13 formed integral with the metal blank of which the head, stem and base are formed.

Although only certain forms of embodiment of the invention are shown and described herein, it will be understood that many changes and modifications may be made therein within the scope of the following claim without departing from the spirit and scope of the invention, it being my intention to claim the same as broadly as the state of the prior art will permit.

What I claim is:

An indicator for automobile headlights, said indicator being formed of a single piece of sheet material and comprising a shank, the lower end of which has an apertured foot and the other end of which has a reflecting surface, the intermediate portion of the shank being provided with a longitudinal stiffening rib, the said sheet material being of such character and thickness that the indicator may be bent or twisted to vary the angular adjustment of the shank and the reflecting surface.

In testimony whereof I have affixed my signature to this specification.

HENRY A. GERKEN.